T. C. LUCE.
AUTOMOBILE STEERING DEVICE.
APPLICATION FILED MAR. 14, 1917.
1,259,539.
Patented Mar. 19, 1918
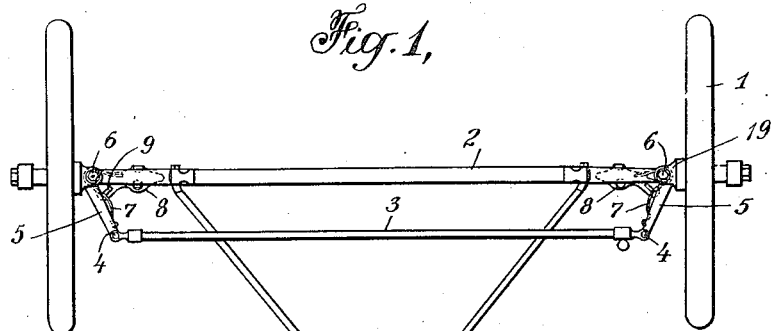
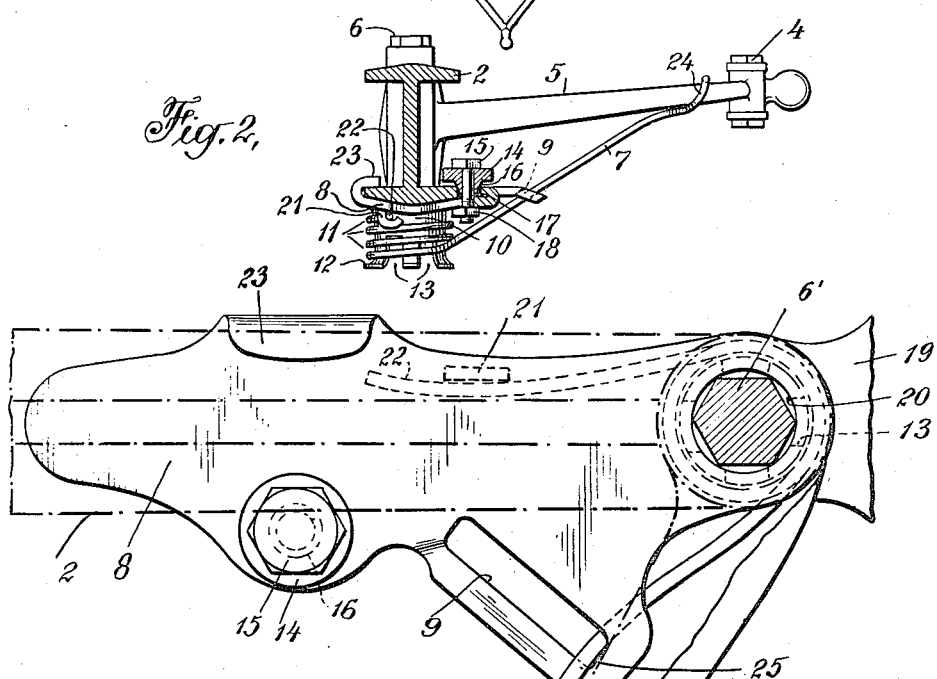
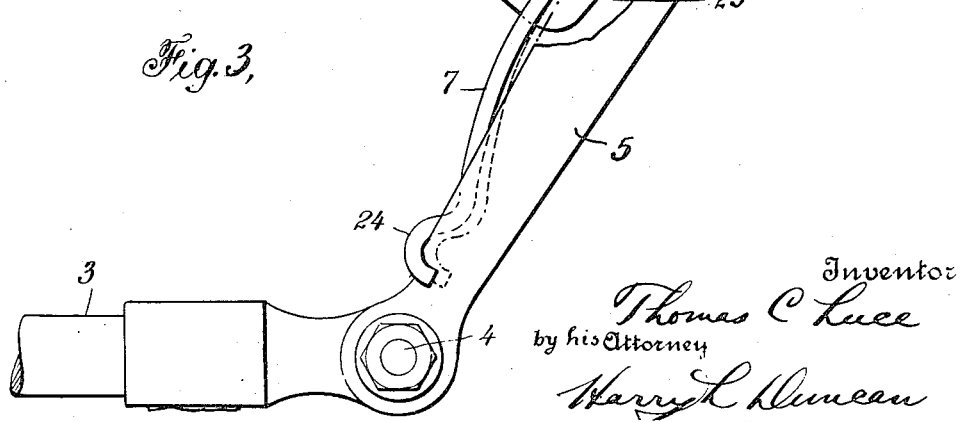
Inventor
Thomas C Luce
by his Attorney
Harry L Duncan

UNITED STATES PATENT OFFICE.

THOMAS C. LUCE, OF STRATFORD, CONNECTICUT.

AUTOMOBILE STEERING DEVICE.

1,259,539.   Specification of Letters Patent.   Patented Mar. 19, 1918.

Application filed March 14, 1917. Serial No. 154,800.

*To all whom it may concern:*

Be it known that I, THOMAS C. LUCE, of Stratford, Fairfield county, Connecticut, have made a certain new and useful Invention Relating to Automobile Steering Devices, of which the following is a specification, taken in connection with the accompanying drawing, forming part of the same.

This invention relates especially to steadying and restoring spring devices for use in connection with the steering gear of Ford or other similarly constructed automobiles. Spring brackets may be secured to the front axle of the machine and carry restoring springs adapted to lightly engage the steering arms or knuckles when the steering gear is in the straight ahead position, but when the steering gear is turned into lateral position to turn the machine to one side one of these restoring springs is held out of engagement by a control member or stop while the other restoring spring exerts a greatly reinforced restoring action on the steering gear tending to restore it to the straight ahead position.

In the drawings showing in a somewhat diagrammatic way an illustrative embodiment of the invention, Figure 1 is a plan view showing the front axle and some of the associated steering mechanism of a Ford automobile.

Fig. 2 is a transverse sectional view of part of the same showing these devices.

Fig. 3 is an enlarged detail top view thereof, the axle and associated parts being indicated as broken away.

In the illustrative embodiment of the invention shown in the drawings this steering device is indicated as coöperating with the axle 2 on which the front wheels 1 are mounted as usual so as to be deflected laterally as desired by the steering gear comprising the steering arms or knuckles 5 connected by the knuckle bolts 6 with the front axle and provided with the extensions 19 supporting the wheels, these steering arms being connected as by a suitable cross-connector rod 3 pivoted by the bolts 4 to the arms. These restoring spring devices or attachments may be conveniently mounted on a suitable spring bracket 8 which may be detachably secured to the lower part of the front axle as by forming one or more securing clips, such as 23, on the bracket to embrace the lower web of the I-beam axle 2 for instance, while one or more clamping bolts such as 15, may be used preferably in connection with wedging clamping washers 14 having the conical or other clamping members 16 projecting between the axle flange and a coöperating flange 17 formed on the bracket so as to tightly hold the bracket in position when nuts such as 18 are screwed up.

It is desirable to definitely maintain this spring bracket in longitudinal alinement with the axle and this may be conveniently accomplished by forming the bracket with an alining member which if desired may also serve as a spring support, this spring support aliner 10 being formed with an aperture 20 of such size as to accommodate the lower end 6' of the knuckle bolt 6 which may fit more or less snugly within this alining aperture as indicated in Fig. 2 so as to securely hold the bracket in alinement so long as the clamping devices keep it on the axle. Each bracket may carry one or more restoring springs each of which may have its dead or inactive end 22 held permanently in place as by being engaged by a spring retainer such as the flange 21, formed on the spring bracket which may be bent over the spring end as indicated in Fig. 2. To secure the desired resilience the spring may be coiled several times around the spring support 10 which is preferably formed with the holding flanges 12 at its lower end so that these outwardly bent flanges hold the spring in proper position on the support, the intervening slots or notches 13 allowing these flanges to be readily bent over into holding position when made of malleable cast iron integral with the spring bracket, if desired.

The resilient spring end is preferably so guided as to disengageably act upon the steering arm or knuckle and be held out of engagement therewith by a control member or stop when the steering gear is turned in one direction and this may be conveniently effected by forming a suitable guide slot 9 in the spring bracket through which the resilient spring end 7 may project so that its embracing gripping tip 24 is guided in the path of the steering arm 5. Thus when the steering gear is in straight ahead position this steering arm is acted upon by the relatively light spring pressure of the resilient spring end beyond the stop member 25 which may be formed at the end of the slot 9 to then engage the spring end. In this way the stronger spring pressure due to the coils and parts inside the slot is taken up by this control member or stop so as preferably not to have any substantial action on the steering arm when the steering gear is in straight ahead position, the remaining resilience of the spring end, which may be sufficient to tend to move it into the dotted position indicated in Fig. 3, only being sufficient to engage the steering arm with enough pressure to take up lost motion and effectively prevent rattling of the parts. When, however, the steering gear is operated so as to turn the vehicle to the right the right hand steering arm 5 shown in Fig. 3 is drawn inward so as to carry the spring tip 24 and resilient spring end 7 away from its control member 25 so that under these conditions the full spring restoring action is exerted on this steering arm and tends to restore the steering gear to straight ahead position and give a desirable "steady steersman" action. Under these conditions the opposite steering arm 5 swings outward as is evident from Fig. 1 and this naturally carries it entirely away from the embracing or gripping tip of the spring end 7 which is, however, held by its guide slot 9 in the path of this steering arm so that when it swings backward it once more engages the gripping tip of the spring. It is thus apparent that this device which can be readily and cheaply made and applied to the automobile is always effective to take up slack in the steering gear and minimize rattling thereof and that whenever the steering gear is operated to turn the vehicle to one side or the other an increased spring restoring action is automatically exerted on the steering gear which is not only desirable in minimizing the effort required to bring back the steering gear to normal straight ahead position, but also in minimizing extreme dangerous positions of the steering gear under running conditions.

This invention has been described in connection with a number of illustrative embodiments, forms, arrangements, parts, materials and proportions, to the details of which disclosure the invention is not of course to be limited, since what is claimed as new and what is desired to be secured by Letters Patent is set forth in the appended claims.

1. In automobile steering devices, the front axle and connected steering arms of an automobile, a spring bracket secured to each end of the axle by integral securing clips and clamping bolts provided with coöperating wedging clamping washers engaging the lower web of the axle and an apertured spring support aliner on said bracket coöperating with the knuckle bolt, a restoring spring having its dead end secured to said spring bracket and having several coils extending around and supported by said spring support, bent holding flanges formed on the lower end of said spring support to permanently hold said spring thereon, the resilient spring end extending through a guide slot formed in said spring bracket and having an embracing gripping tip normally held in the path of the steering arm to exert a stronger restoring action thereon when said steering arm moves inward into lateral steering position.

2. In automobile steering devices, the front axle and connected steering arms of an automobile, a spring bracket secured to each end of the axle by integral securing clips and clamping bolts engaging the lower web of the axle and an apertured spring support or aliner on said bracket coöperating with the knuckle bolt, a restoring spring having its dead end secured to said spring bracket and having several coils extending around and supported by said spring support, the resilient spring end extending through a guide slot formed in said spring bracket and having a tip normally held in the path of the steering arm to exert a stronger restoring action thereon when said steering arm moves inward into lateral steering position.

3. A restoring spring steering attachment adapted to coöperate with the front axle and connected steering arms of an automobile, and comprising a spring bracket having an integral securing clip and a clamping bolt provided with a coöperating wedging clamping washer adapted to engage the lower web of the axle and having an apertured spring support aliner adapted to coöperate with the knuckle bolt at the end of the axle, a restoring spring having its dead end secured to said spring bracket and having several coils extending around and supported by said spring support, bent holding flanges formed on the lower end of said spring support to permanentlly hold said spring thereon, a resilient end on said spring extending through a guide slot formed in said spring bracket and having an embracing gripping tip to be normally held in the path of the steering arm to exert a strong restoring action thereon when said steering arm moves inward into lateral steering position and a control stop member on said bracket to be engaged by said spring end when the steering gear is in straight ahead position to then allow said spring to exert only a light pressure on said steering arm.

4. A restoring spring steering attachment adapted to coöperate with the front axle and connected steering arms of an automobile, and comprising a spring bracket having an integral securing clip and a clamping bolt adapted to engage the lower web of the axle and having an apertured spring support aliner adapted to coöperate with the knuckle bolt at the end of the axle, a restoring spring having its dead end secured to said spring bracket and having several coils extending around and supported by said spring support, a resilient end on said spring having an embracing gripping tip to be normally held in the path of the steering arm to exert a strong restoring action thereon when said steering arm moves inward into lateral steering position and a control stop member on said bracket to be engaged by said spring end when the steering gear is in straight ahead position to then allow said spring to exert only a light pressure on said steering arm.

5. A restoring spring steering attachment adapted to coöperate with the front axle and connected steering arms of an automobile and comprising a spring bracket having integral alining securing members adapted to engage the automobile axle, a restoring spring having its dead end secured to said spring bracket and having several coils supported thereon, the resilient end of said spring extending through a guide slot formed in said spring bracket and having an embracing gripping tip normally held in the path of the steering arm to exert a strong restoring action thereon when said steering arm moves inward into lateral steering position and a control stop member on said bracket and engaged by said spring end when the steering gear is in straight ahead position to then minimize the spring pressure on said steering arm.

6. A restoring spring steering attachment adapted to coöperate with the front axle and connected steering arms of an automobile and comprising a spring bracket having securing members adapted to engage the automobile axle, a restoring spring having its dead end secured to said spring bracket and having several coils supported thereon, the resilient end of said spring having an embracing gripping tip normally held in the path of the steering arm to exert a strong restoring action thereon when said steering arm moves inward into lateral steering position and a control member on said bracket and engaged by said spring end when the steering gear is in straight ahead position to then minimize the spring pressure on said steering arm.

7. A restoring spring steering attachment adapted to coöperate with an automobile and comprising a spring bracket having securing members adapted to engage the automobile, a restoring spring secured to said spring bracket, the resilient end of said spring having a tip normally held in the path of the steering arm to exert a strong restoring action thereon when said steering arm moves inward into lateral steering position and a control member on said bracket and engaged by said spring end when the steering gear is in straight ahead position to then minimize the spring pressure on said steering arm.

THOMAS C. LUCE.

Witnesses:
WALTER F. FITZGERALD,
WILLIAM SIEGLER.